United States Patent [19]

Sfarti

[11] Patent Number: 5,528,737
[45] Date of Patent: Jun. 18, 1996

[54] PROCESSOR-BASED METHOD FOR RASTERIZING POLYGONS AT AN ARBITRARY PRECISION

[75] Inventor: Adrian Sfarti, Sunnyvale, Calif.

[73] Assignee: Silicon Graphics, Inc., Mountain View, Calif.

[21] Appl. No.: 170,071

[22] Filed: Dec. 14, 1993

[51] Int. Cl.⁶ .................................................. G06F 15/62
[52] U.S. Cl. .................................................................. 395/141
[58] Field of Search ................................... 395/133, 141, 395/124, 132, 140; 345/113, 118, 147

[56] References Cited

U.S. PATENT DOCUMENTS

| | | | |
|---|---|---|---|
| 5,043,711 | 8/1991 | Harrington | 340/728 |
| 5,129,051 | 7/1992 | Cain | 395/133 |
| 5,133,049 | 7/1992 | Cain et al. | 394/133 |
| 5,142,617 | 8/1992 | Dalrymple et al. | 395/132 |

*Primary Examiner*—Phu K. Nguyen
*Attorney, Agent, or Firm*—Sterne, Kessler, Goldstein & Fox

[57] ABSTRACT

An image processor is provided which rasterizes polygons with a minimum of computation. Pixels are tested for being inside a triangle by sorting the vertices by their values in one coordinate, rounding the vertices to the nearest pixels, and calculating two characteristic functions for pixels one scan line at a time, thereby identifying two end pixels for the scan line, where the particular functions used are edge characteristic functions for the two edges which bound pixels in the scan line within the triangle defined by the rounded vertices. To avoid ambiguity, pixels on one end of a scan line are deemed outside the triangle if they are exactly on the edge. Alternatively, only one function per pixel is used, the edge function for the nearest edge. The rasterization process is extensible to polygons of more than three sides, by taking into account that only two sides of the polygon need to be considered for a given scan line, and thus only two characteristic functions are needed at any one time. Using just the fractional part of an edge's intersection with a scan line to detect whether a pixel is inside or outside is also possible. Where a characteristic function is used, the value of the function can be used as an anti-aliasing value, which would be a measure of how much of the pixel lies inside the triangle.

9 Claims, 6 Drawing Sheets

PROCESSOR-BASED METHOD FOR RASTERIZING POLYGONS AT AN ARBITRARY PRECISION

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to the field of computer graphics and more specifically, efficient image rendering and polygon rasterization.

Image rendering is the process of transforming a collection of geometrically described objects into a pixel array which forms an image view of those objects. A particular view of a scene could be presented to a viewer by placing real objects in a space and allowing the viewer to view these objects from a viewpoint in that space through view opening. A two-dimensional simulated image of that scene can be generated for display on a display device to create the same view. To do this, the real objects are modelled by geometric expressions and coordinates in a space, a viewpoint and a view opening are positioned in the space, and the resulting image is rendered from this information. Typically, the view opening corresponds to a display surface of a display device. For a computer monitor, the display surface is the screen; for a printer, the display surface is a printed page.

Points in the virtual space are described by "world coordinates" and are usually represented by digital values in a digital image processing computer. Points on the display surface are described by "pixel grid" or "image" coordinates, and according to the well known art of ray tracing, points in the space defined in world coordinates can be mapped to points defined in pixel grid coordinates on the display surface, given the location of the viewpoint and the view opening in world coordinates.

Pixel grid coordinates are especially useful when rendering an image if the pixels of the display device are regularly spaced in a two-dimensional rectangular array and if the pixel grid coordinates are arranged such that either every pixel corner or every pixel center is located at integer pixel grid coordinates. Although it is arbitrary, herein pixel grid coordinates are such that the corner of each pixel is at integer coordinates. In real display devices, pixels might not be rectangles, but image manipulation is done nonetheless assuming that pixels have a finite area and are rectangular. Any deviation from this assumption can be addressed after the image is rendered in a number of ways which are beyond the present subject.

The input to an image rendering apparatus is a collection of geometrical descriptions of objects. The description might be as simple as the description of a uniformly red sphere, which is described by a center point, a radius, and a color. Other more complex objects could include descriptions of shape, size, orientation, surface features such as roughness, color, reflectivity (diffuse and/or specular), and self-luminosity. Although not strictly geometrical, a description of an object might include a collection of data describing a surface of the object, such as would be the case for the description of an object whose surface is an image of a digitized painting.

Where a display surface comprises a finite number of pixels, each of which can take on one of a finite number of colors, the final result of the rendering process is a block of data with one value for each of the finite number of pixels in the display device, the one value for a pixel indicating the color to be used for that pixel out of the finite number of colors in order to display the image. Such a display device is referred to herein as a "pixelated" or "raster" display device. "Raster" refers to the organization of pixels into rows, or scan lines, which typically run from left to right in an image, where an image is formed from multiple scan lines arranged from the top of the image to the bottom.

For brevity, "image" and "image block" herein refer to the block of data which is the expression of the image in the form usable by the display device. As should be apparent, a collection of object descriptions can exist without reference to a particular display device, but an image block is a function of the display device, or at least the number of pixels and the number of colors in the palette of colors available to a pixel. As should also be apparent, images can be processed and rendered without having a device to actually display the result.

Rendering a moderately complex set of objects into an image requires considerable computation. First, a number of calculations are needed to determine the location of the objects in the image and which objects obscure other objects. Then, the objects which are visible need to be projected onto the view opening to convert their descriptions from world coordinates to pixel grid coordinates. Visible objects also need to be shaded, and reflections and lighting must be taken into account.

Because of the processing needed, the image is often broken down into finite elements and each of these finite elements are separately processed, sometime in parallel. One way to break an image down is to divide the image into projections of surfaces in the object space. Because of the simplicity of triangles, typically, all polygons are further subdivided into triangles. The location of each of these triangles can be expressed by three points in pixel grid coordinates, but what is more useful is representing the triangle by the set of pixels which are within the triangle. This process is called polygon rasterization, since it is the process of converting the vectors of the polygon into a set of pixels in a pixel array's raster pattern. More precisely, the raster pattern for a polygon is the collection of pixels whose centers fall within the polygon. In some cases, the raster pattern includes pixels which are partially within the polygon, with some indication of the degree to which they are inside the polygon.

Because polygon rasterization necessarily results in a pixel pattern which is only an approximation of the polygon, it is important to accurately determine which pixels are part of the polygon and which pixels are not. Once pixels in the pixel array are associated with a particular polygon, functions which describe the color of the polygon over its visible surface are used to determine the colors of those associated pixels.

If a pixel is associated with the wrong polygon, it is likely to be colored incorrectly. For example, if the image shows two polygons which are supposed to describe a continuous surface of an object, each pixel along the boundary of the two polygons must be assigned to one or the other polygon. If the boundary is calculated incorrectly, one or more pixels might not be assigned to either polygon, in which case it would be colored the color of whatever is behind the two polygons. Then, if the background color is different from the color of the object represented by the two polygons, the image will show dots ("z poke-throughs") in the middle of the object, which are undesirable artifacts.

Therefore, it is important to correctly determine which pixels are inside a polygon. However, this determination must be done with a minimum of computation, since an image must be rendered quickly, and this determination is repeated many times for an image.

One method for polygon rasterization is shown by J. Pineda, "A Parallel Algorithm for Polygon Rasterization", *Computer Graphics*, Vol. 22, No. 4 (August 1988) (hereinafter "Pineda"). In Pineda, a triangle is rasterized by scanning the pixel array and evaluating three characteristic functions at each point. If the characteristic functions for a pixel all have the same sign, then the pixel is assigned to the inside of the triangle. However, rather than calculating the characteristic functions from scratch at each pixel, they are calculated by interpolation from prior function values and the derivative of the function values with respect to image coordinates. Although the functions are linear, and thus should have no error after repeated interpolation, when the process is performed in a digital computer with a finite precision, round-off errors will accumulate and could cause errors. Pineda addresses this problem by using high enough precision to give acceptable error (p. 19, second column). However, it is not disclosed how to determine what the error would be or what error is acceptable.

Pineda also discloses a method for scanning the triangle to be assured that each pixel in the triangle is found, and calculates the characteristic functions at each pixel found. However, this is not all that efficient, and often requires extra computation to locate triangle edges from scan line to scan line.

From the above it is seen that a faster and more accurate means for polygon rasterization is needed.

SUMMARY OF THE INVENTION

An improved method and apparatus for rasterizing polygons, and triangles in particular is provided by virtue of the present invention, which allows for faster rasterization of images with fewer undesirable artifacts.

In one embodiment of the present invention, pixels are tested for being inside a triangle by sorting the vertices by their values in one coordinate, rounding the vertices to the nearest pixels, and calculating two characteristic functions for pixels one scan line at a time, thereby identifying two end pixels for the scan line, where the particular functions used are edge characteristic functions for the two edges which bound pixels in the scan line within the triangle defined by the rounded vertices. Because the vertices are sorted, which edges bound which scan lines are easily determined. Because the vertices are rounded in the edge functions, the edge functions are exact, involving no division, and therefore are not subject to accumulated interpolation errors. To avoid ambiguity, pixels on one end of a scan line are deemed outside the triangle if they are exactly on the edge. Directions in an image are often arbitrarily assigned such that scan lines are horizontal and pixels on the right edge are those which are deemed outside the triangle.

While the rounding of all vertices in an image distorts the image somewhat, by shifting feature edges and points, the distortion is much less objectionable than the errors, such as poke-throughs, which might occur in images where rounding is not used. Rounding ensures that, regardless of how the bounds of the polygons intersect the pixel grid of the image, there will be a one to one correspondence between pixels and the triangle which colors that pixel for opaque triangles.

In an alternative embodiment, only one function per pixel is used. The function is the edge function for the nearest edge. To avoid the problem of a left end pixel being to the right of the right edge, and vice versa, this condition is tested for, and if that is the case, no pixels in the scan line are assigned to the inside of the triangle.

The rasterization process is easily extensible to polygons of more than three sides, by taking into account that only two sides of the polygon need to be considered for a given triangle's scan line, and thus only two characteristic functions are needed at any one time.

Using no characteristic functions, just using the fractional part of an edge's intersection with a scan line to detect whether a pixel is inside or outside, speeds up computation, but at the expense of precision.

Using the characteristic function, the value of the function can be used as an anti-aliasing value, which provides a measure of how much of the pixel lies inside the triangle.

A further understanding of the nature and advantages of the inventions herein may be realized by reference to the remaining portions of the specification and the attached drawings.

Three appendices are attached to this specification, each of which show an embodiment of portions of the present invention implemented by a digital computer programmed according to the pseudo-code shown in the respective appendix.

DESCRIPTION OF THE PREFERRED EMBODIMENTS

Figure 1:
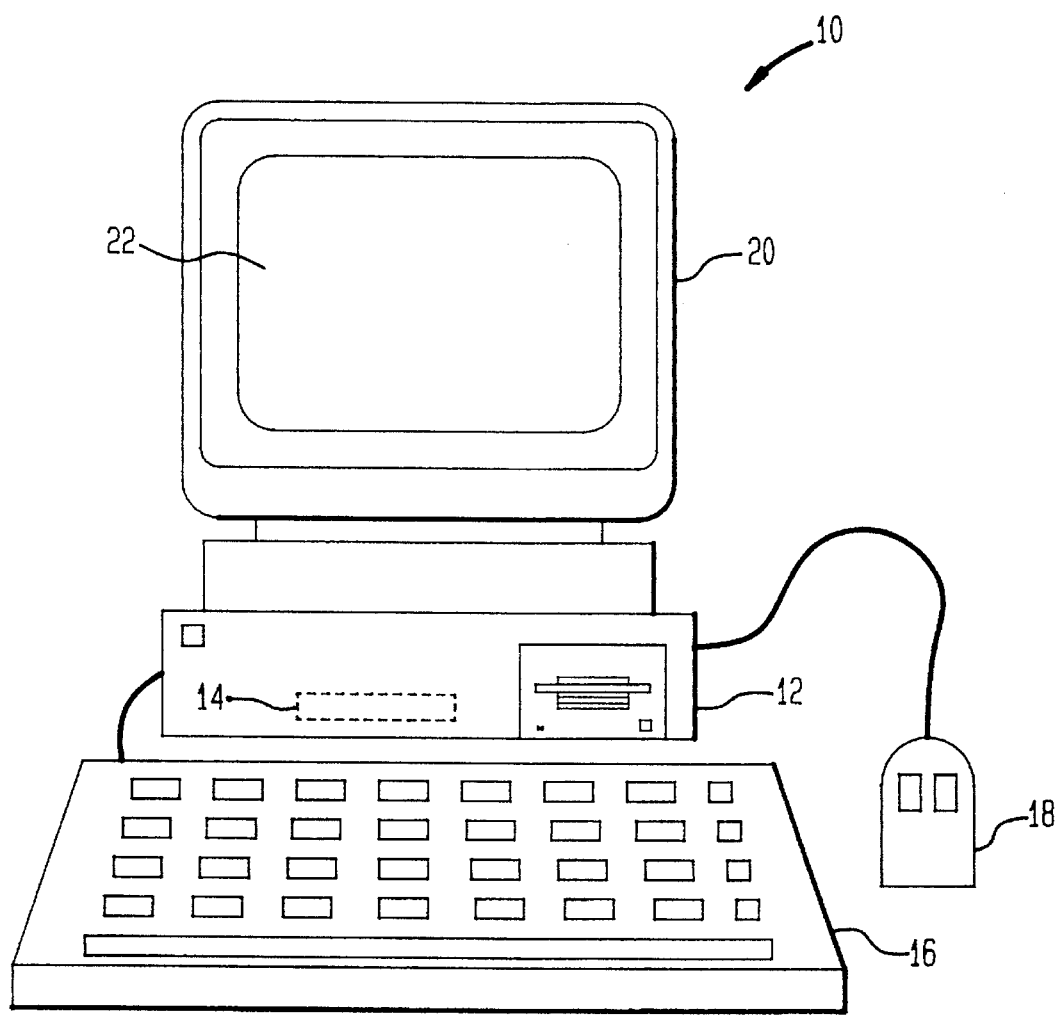
FIG. 1 is an illustration of a workstation in which an embodiment of the present invention is implemented, including a computer and peripherals.

FIG. 1 is an illustration of a workstation 10, which includes a computer system 12 coupled to a fixed disk 14, a keyboard 16, a mouse 18, and a monitor 20. Monitor 20 is shown with a display surface 22. The examples that follow will refer to an image being displayed on display surface 22 of monitor 20 from a collection of object descriptions stored on fixed disk 14, however the invention is equally applicable to variations such as where the display device is a printer and the display surface is a printed page, or the display device is some other pixelated display device. The source of the object descriptions also need not be disk 14, but could be mouse 18, keyboard 16, or some other input means not shown, or a combination of the above.

Figure 2:
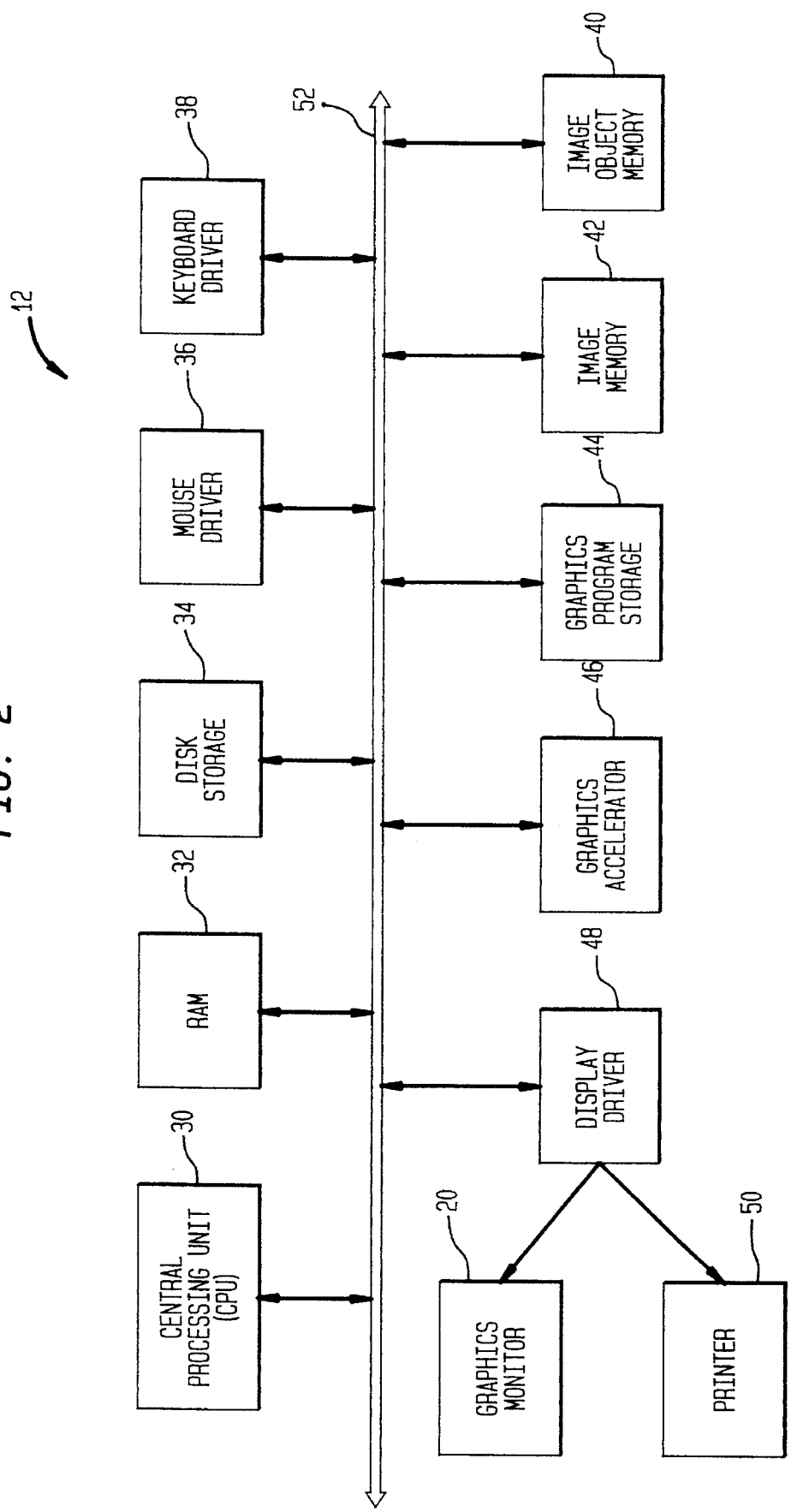
FIG. 2 is a block diagram of the computer shown in FIG. 1, including storage for a graphics program.

FIG. 2 is a block diagram of computer system 12. Computer system 12 is shown with a central processing unit ("CPU") 30, random access memory ("RAM") 32, a disk 34, a mouse driver 36, a keyboard driver 38, an image object memory 40, and image memory 42, a graphics program memory 44, an optional graphics accelerator 46, and a display driver 48 all coupled by a computer bus 52. Display driver 48 is shown coupled to monitor 20 and a printer 50. In variations of computer system 12, one or more elements might be combined. For example image memory 42 might be a part of RAM 32, or mouse driver 36 and keyboard driver might be combined.

CPU 30 is used to process instructions of a graphics program to generate an image, and possibly other computing tasks. Typically, CPU 30 controls the interaction of the items coupled to bus 52. For example, CPU 30 uses RAM 32 to store variables and data arrays used in processing an image, disk 34 to permanently store instructions of a graphics program, mouse driver 36 is get input from mouse 18, and keyboard driver 38 to get input from keyboard 16.

In an image processing operation, CPU 30 first moves a graphics program to more accessible graphics program storage 44, and moves a collection of object descriptions into image object memory 40. Running the graphics program causes CPU 30 to read descriptions of objects from image object memory 40 to generate an image, which is then stored in image memory 42. The processing can either be done all by CPU 30, or some operations might be passed to graphics accelerator 46 for faster processing. Once the image is generated, it can be moved from image memory 42 to display driver 48, which outputs it to one or more display devices.

Image object memory 40 is different from image memory 42, in that image object memory 40 stores descriptions of objects and image memory 42 stores the pixels of the image of the objects. For example, for an image of a red sphere illuminated by a white light in front of a blue background, image object memory 40 would store the location in world coordinates of the center of the sphere, its radius, a value representing the color red, the location in world coordinates of the light, a viewpoint, a view opening, and the color of the background. By contrast, image memory 42 would contain, after processing, a two-dimensional array corresponding to the two-dimensional array of pixels which make up display surface 22. In image memory 42, one color value is stored for each pixel, most likely color values for reds and blues depending on the location of the pixel on display surface 22. The color values, when displayed, form an image of the red sphere and the blue background.

Figure 4:
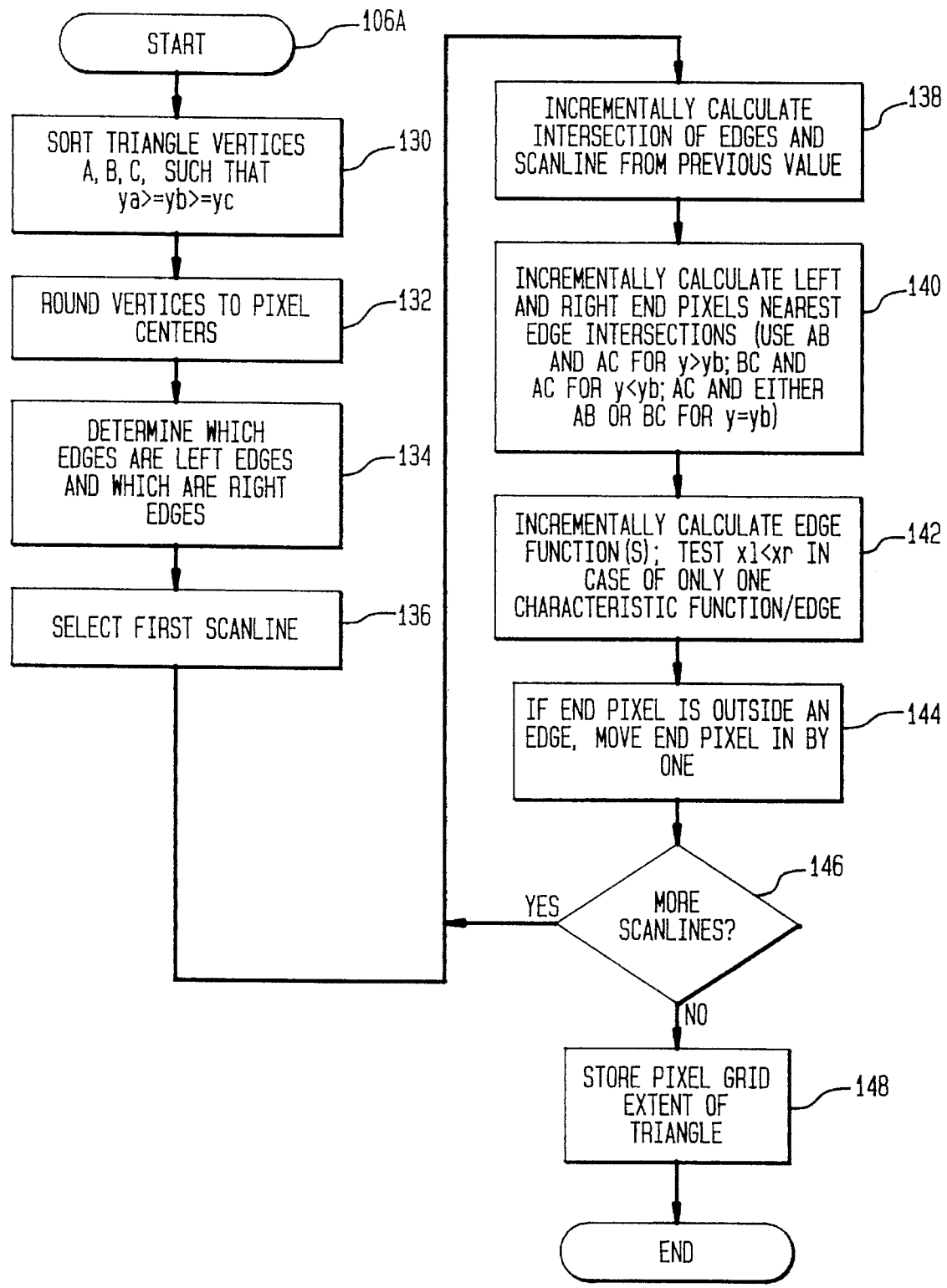
FIG. 4 is a flowchart of a subprogram of the graphics program shown in FIG. 3.
Figure 5:
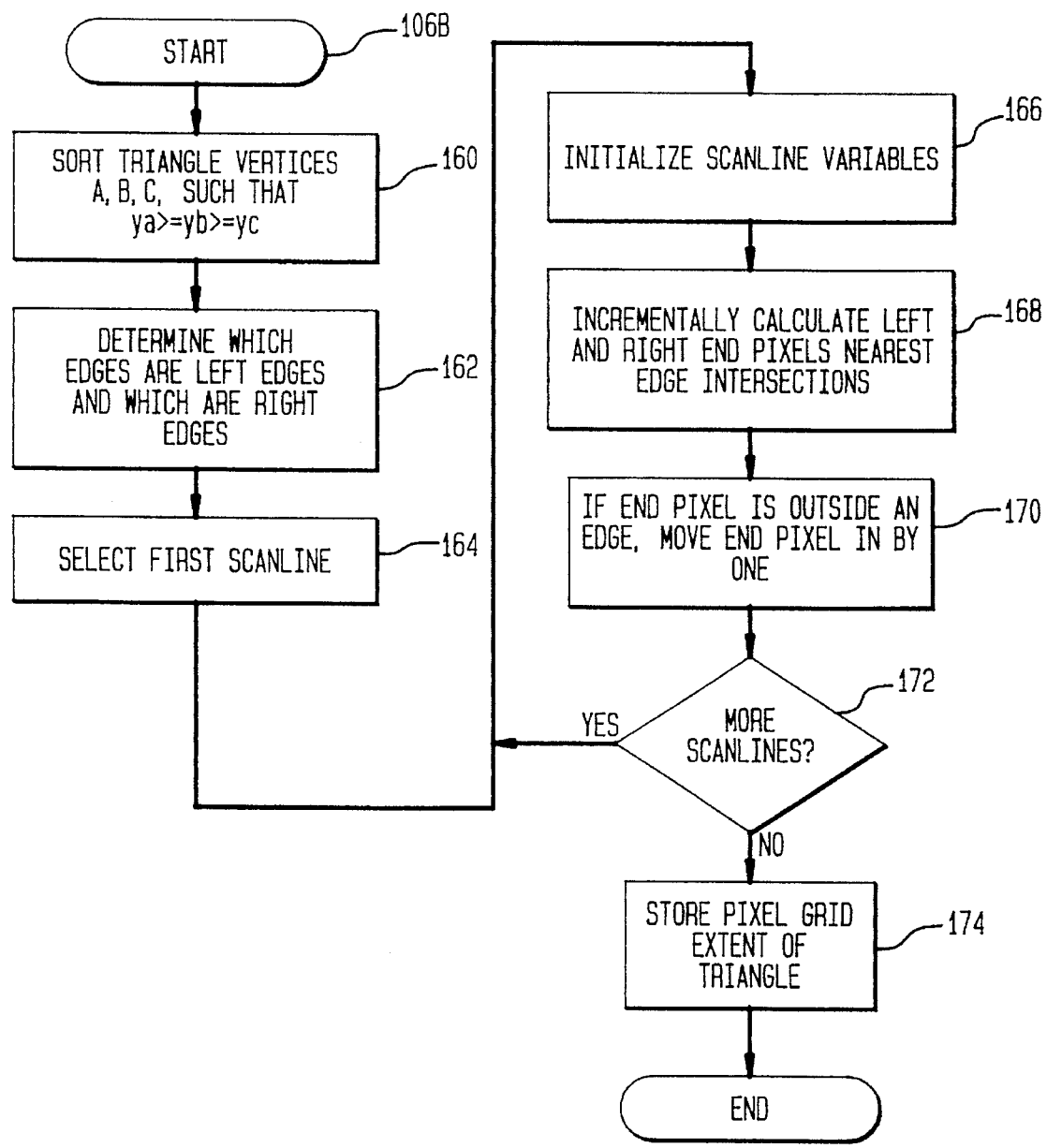
FIG. 5 is a flowchart of another variation of a subprogram of the graphics program shown in FIG. 3.

In a preferred embodiment, the details of the operation of computer system 12 needed to generate an image in memory 42 from object descriptions in object memory 40 are determined by the graphics program stored in storage 44. The details of these operations are shown in the flowcharts of FIGS. 3–5.

Figure 3:
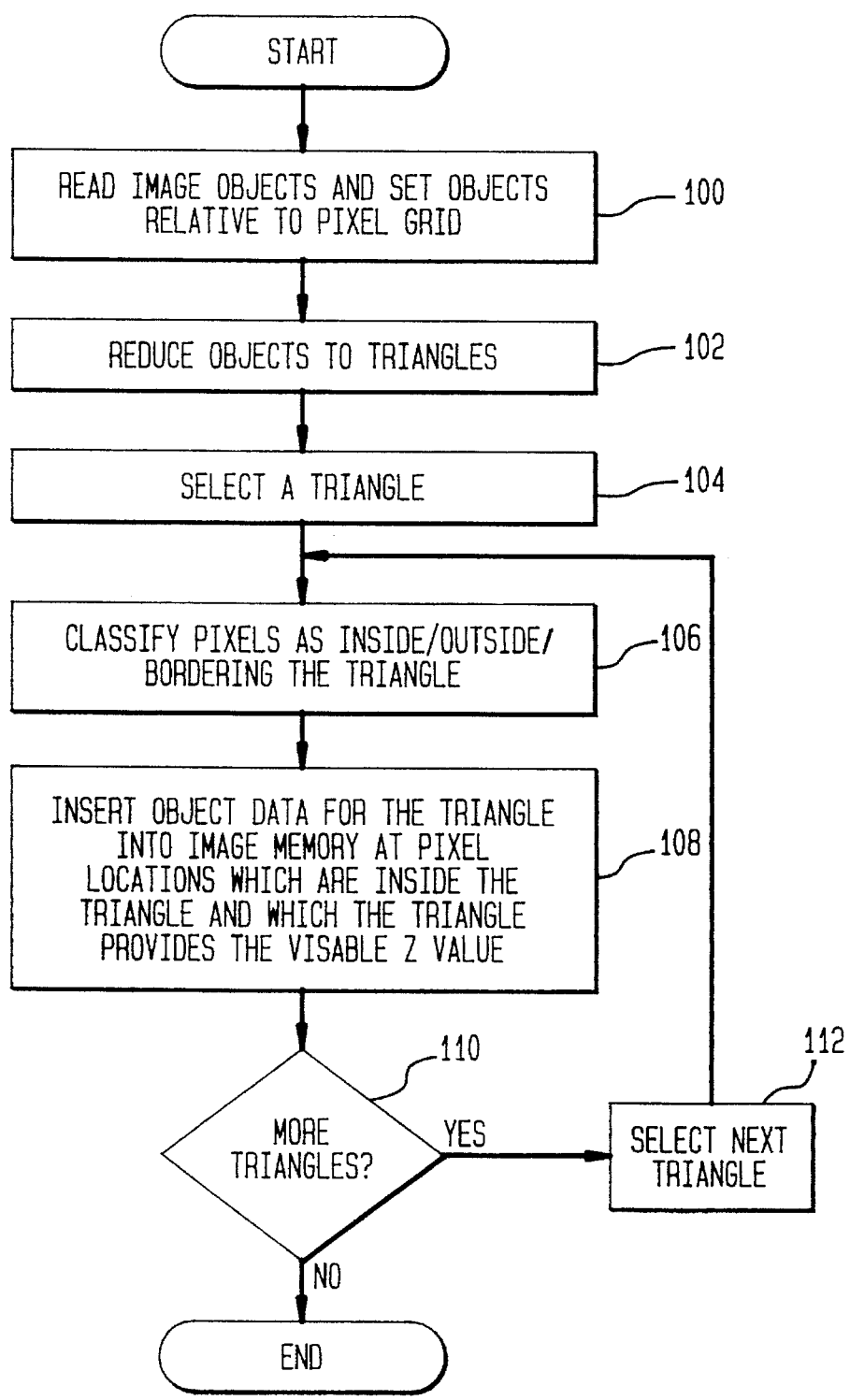
FIG. 3 is a flowchart of a graphics program according to the present invention.

FIG. 3 is a flowchart of the process of converting a collection of object descriptions to a set of pixel color values which form an image on a particular image display device. The flow of the program is from block 100 to block 102 and then to block 104. From there, the flow is to blocks 106, 108, and then 110. From block 110, the flow either terminates or flows to block 112 and back to block 106.

At block 100, CPU 30 reads object descriptions from image object memory 40, and converts the descriptions to image coordinates, if necessary. If the objects are described in a three-dimensional space, their world coordinates are converted to image coordinates taking into account a view opening and a viewpoint. If the objects are described as objects in a two-dimensional space, then the objects might be convertible to image coordinates by scaling and translation as appropriate.

At block 102, CPU 30 reduces the objects descriptions to triangles. For example, a square object is replaced with two or more triangles occupying the same image area as the square and having the same color function across their surface. A circle can also be represented by a number of triangles, but not exactly. Of course, if the objects are already described by triangles, the step is not needed. For a later rounding step to work properly, triangles are subdivided if another triangle's vertex joins it at other than a vertex. The subdivision is done at the point which the other vertex touches the triangle, to ensure that the image is made up of triangles in which no vertex of a triangle meets another triangle at other than a vertex. Of course, if the method where dealing with polygons of more than three sides, a triangle can be treated as a quadrilateral with two initially collinear sides with a common vertex at the point where another vertex touches the polygon. This is referred to as a "well-behaved" polygonal image.

At block 104, CPU 30 selects a triangle in order to process each triangle through blocks 106 and 108. In a variation of this process, triangles are processed in parallel.

At block 106, pixels are classified as being inside or outside the triangle. If the objects are described as two-dimensional objects which don't overlap, then it would be sufficient to indicate for each pixel the triangle to which it belongs. For overlapping triangles in two or three dimensions, a pixel might be inside more than one triangle. In these cases, which triangle is visible at which pixel is resolved in a later step. This step often requires considerable computation and is performed many times, therefore reductions in the number of calculations needed at this step will greatly improve the speed at which an image is generated from object descriptions. Details of processes which implement this step are shown in FIGS. 4 and 5. The result of this step is the identification of which pixels fall within the selected triangle.

At block 108, object data is inserted into image memory 42 for those pixels which are inside the selected triangle. Typical object data includes the color of the pixel, which is derived from a surface color function for the triangle, and a z value, which is determined geometrically from the world coordinates of the triangle. A z value of a point on a triangle indicates the z coordinate of the point, which is roughly its distance from the view opening. Consequently, if a pixel is within two or more triangles, the visible triangle at that pixel will be the point on the triangle with the lowest z value, assuming that the triangles are all opaque. For simplicity, the object data and z value might only be written to image memory 42 if the z value is less than the z value already stored in image memory 42, thus implementing invisible surface elimination.

At block 110, the triangles created at block 102 are reviewed to see if any triangles remain to be processed. If there are any more triangles, flow proceeds to block 112, where the next triangle is selected, before returning back to block 106. If there are no more triangles, the process ends, resulting in data in image memory 42 which can be passed to display driver 48 for display or storage for later display. Of course, if CPU 30 can determine before processing that a given triangle is not visible, steps 106 and 108 need not be done for such a triangle.

FIG. 4 is a flowchart of a process 106A for classifying pixels as being inside, outside, or bordering on a triangle, as might be done by CPU 30 at block 106 (see FIG. 3). The flow of the process begins at the block labelled 106A, and proceeds through blocks 130, 132, 134 and 136. From block 136, the steps in blocks 138, 140, 142 and 144 are performed for each scan line covered by the triangle. At block 146, the flow is to block 138 if any scan lines have not been processed, otherwise flow proceeds to block 148, and then the process is complete.

At block 130, the vertices of the triangle, A, B and C, are sorted such that the y coordinate of A is not less than that of B, and the y coordinate of B is not less than that of C.

At block 132, the vertices A, B and C are rounded to pixel centers.

At block 134, the edges AB, BC and AC are classified as being either left or right edges. Since the vertices are ordered by their y coordinate, and B is between A and C, then edges AB and BC are on the same side and opposite edge AC. Therefore, the sides of all the edges can be determined from the side of edge AB. The slope of the edges can be determined from the coordinates of their endpoints, and whether edge AB is a left or right edge can be determined by comparing the slopes of edges AB and AC.

At block 136, the first scan line is selected to be processed in later blocks. The first scan line, since the vertices are ordered, is the scan line containing the vertex A. The last scan line is the scan line containing vertex C.

At block 138, the intersection of the edges and the scan line are calculated. For scan lines on or above the y coordinate of vertex B, the edges of interest are AB and AC, while on or below that point the edges of interest are BC and AC (note that either set of two edges can be used for a y exactly on the y coordinate of vertex B). In very fast, repetitive operations, addition and subtraction is preferred to multiplication and division because of the computation required. Therefore, rather than calculate the intersection from scratch for each scan line, which would involve division, the intersection of the edges with each successive scan line is calculated incrementally, by adding a precalculated value of the distance between scan lines divided by the slope of the edge to the value of the intersection calculated in the previous scan line.

At block 140, the pixels nearest the intersections of the edges and the scan line are identified as the left and right end pixels for the scan line, one for the edge to the left and one for the edge to the right. This step only determines the pixel whose center is closest to the edge. An edge either passes exactly through a pixel or passes between two pixels. In the former case, the pixel passed though is selected, and in the latter case, the closest of the two pixels are selected. Since the pixels nearest the intersection might be outside the triangle, another step is needed to determine if the selected pixel is inside the triangle. If it isn't, the pixel to the right (for the left end) or to the left (for the right end) is used as the end pixel. It is, of course, possible that no pixel will be selected for a scan line, such as would be the case where the top vertex A is just above the bottom of a row of pixels.

Since the characteristic functions use rounded coordinates to calculate intersections, pixels are associated not with the inside and outside of the original ABC triangle, but the inside and outside of the triangle formed by rounding, or snapping, the original triangle to pixel centers. Since no vertices in a well-behaved image touch another polygon at other than a vertex, snapping the vertices to pixel centers will not open any space (that did not already exist) between the polygons.

Characteristic edge functions are used to quickly and precisely determine whether a given pixel's center is inside a triangle. The characteristic functions for a point are functions of the coordinates of the vertices of the triangle and the coordinates of the point being evaluated. The three characteristic functions for a point (x,y) relative to a triangle defined by vertices A, B and C, with coordinates (xa,ya), (xb,yb) and (xc,yc) respectively, are:

$$f(x,y)=Apxac=(x-xa)(yc-ya)-(y-ya)(xc-xa),$$

$$g(x,y)=Cpxcb=(x-xc)(yb-yc)-(y-yc)(xb-xc),$$

and $$h(x,y)=Bpxba=(x-xb)(ya-yb)-(y-yb)(xa-xb),$$

which can also be expressed as:

$$f(x,y)=f1*x+f2*y+f3,$$

$$g(x,y)=g1*x+g2*y+g3,$$

and $$h(x,y)=h1*x+h2*y+h3.$$

A characteristic edge function value for a point P is equal to the magnitude of the cross-product of a vector from one endpoint of an edge to another endpoint and a vector from the first endpoint to P. Because of this, the sign of the edge function indicates on which side of the edge the point P is. The characteristic edge function is useful for determining on which side of an edge a point in the center of a pixel is, but is also useful for determining how close the pixel is to the edge, and how much of the pixel is inside and outside the triangle bounded by the edge. This value would be useful, for example, to perform anti-aliasing, where the pixels along an edge between two polygons are colored by a weighted color between the colors of the two polygons, where the weighting of the two colors is determined by how much of the pixel is in each of the polygons.

To ensure that coefficients in the above equations are integral (of at least exactly specifiable with a finite number of decimal or binary points), the A, B and C values in the equations are rounded to pixel centers. Since these edge functions are calculated from rounded vertices, there is no division involved, and thus the values of the characteristic functions at pixel centers are exact. Therefore, repeated interpolation of the values for these functions from pixel center to pixel center will not result in accumulated error.

To avoid multiplication, characteristic functions for a pixel can be calculated by adding or subtracting, as appropriate, the quantities f1, f2, g1, g2, h1 and h2 from previously calculated value of the characteristic functions. If the characteristic functions for a pixel center are nonzero and have the same sign, then the pixel center is within the triangle. If they are nonzero with different signs, the pixel center is outside the triangle, and if one of the functions evaluates to zero, the pixel center is on the edge. To avoid ambiguity when a pixel is centered on an edge, the pixel is deemed to be part of the triangle to the pixel's left.

The characteristic functions are incrementally calculated at block 142. However, not all three characteristic functions need to be calculated for each pixel. For example, pixels in scan lines above y=yb are known to be on the same side of BC as the inside of the triangle, so g(x,y) need not be calculated, and the computational effort for calculating characteristic functions is reduced by a third. Where two characteristic functions are calculated per pixel, if they are the same sign, the pixel is in the triangle, if they have a different sign, the pixel is outside the triangle, and if one is zero, then the point is exactly on an edge. Likewise, in the bottom part of the triangle (scan lines with y<yb), the two characteristic functions really only need to be calculated for pixels near the triangles edges, because for a given scan line, once the left and right end pixels are determined, the pixels in between must be inside pixels, since triangles are convex.

In an alternate embodiment, only one characteristic function needs to be calculated for each pixel. The one characteristic function used depends on whether the pixel is above y=yb or below, and whether it being tested for being a left end pixel or a right end pixel. For example, if a pixel is being tested to see if it is a left end pixel, the scan line for the pixel is above y=yb, and the edge AB is a left edge, then only the function h(x,y) need be calculated. With one exception, if h(x,y) is positive, then the pixel center is inside the triangle. Similarly, f(x,y) is used for the right edge. The exception is where the left end pixel is to the left of the left edge, but is also to the left of the right edge. In this case, the left end pixel will be to the right of the right end pixel, and one additional test per scan line is needed to detect this condition. Under this condition, no pixel centers on that scan line are inside the triangle.

At block 144, if not already done, if an initial end pixel is found in block 142 to be outside the triangle, the pixel just inside that end pixel is made the new end pixel. As a result of this block, the left and right pixels in a scan line are identified, where the end pixels define the range of pixels which are inside the triangle. This range can be determined without calculating characteristic functions at every pixel inside the triangle.

At block 146, the next scan line is processed until all scan lines have been processed to determine their end pixels. At block 148, the extent of the triangle ABC, i.e., an indication of the pixels whose centers are inside the triangle, is stored. If this process is part of the flow shown in FIG. 3, then CPU 30 stores object data in image memory 42 for the pixels which are part of the extent.

FIG. 5 is a flowchart of a variation of the classification process which requires no characteristic functions, but which is not as exact as the process shown in FIG. 4. The process is typically performed by instructions given to CPU 30. The process starts at block 106B and flows to blocks 160, 162 and 164, then proceeding in a loop comprising blocks 166, 168 and 170 for each scan line, with the decision to loop back made at block 172. After all scan lines are processed, CPU 30 proceeds to block 174 and ends the process.

At blocks 160, 162 and 164, CPU 30 performs the same steps as in blocks 130, 134 and 136 shown in FIG. 4. Thus, CPU 30 begins the loop of processing scan lines knowing the which edges of AB, BC and AC bound the scan line.

At block 166, scan line variables are initialized. Such variables include the unrounded intersection of the edges and the center of the scan line of pixels.

At block 168, CPU 30 calculates the two pixels nearest the two edges passing through the scan line. These end pixels are found from the intersection of the edges with the previous scan line and adjusting by the slopes of the edges to find the intersections in the current scan line. For scan lines above y=yb, the lines AB and AC are used, and below y=yb, the lines BC and AC are used. If the vertex B is exactly aligned with the pixel centers of the pixels in the scan line, AC and either AB or BC can be used.

Of course, if the precisions of the slope and the vertices are not high enough, sufficient error will accumulate in the repeated interpolation of the edges and cause the wrong pixel to be selected at the bounds of a triangle. However, even with this possibility of error, the process shown in FIG. 5 is faster than prior systems, for one, because it does not look at each pixel in the triangle, but just works its way down the triangle, two edges at a time.

At block 170, CPU 30, using the information about which edge is a left edge and which is a right edge, moves the end pixels in by one pixel if they are found to be outside the triangle.

At block 172, the next scan line is processed until all scan lines have been processed to determine their end pixels. At block 174, the extent of the triangle ABC is stored.

Figure 6:
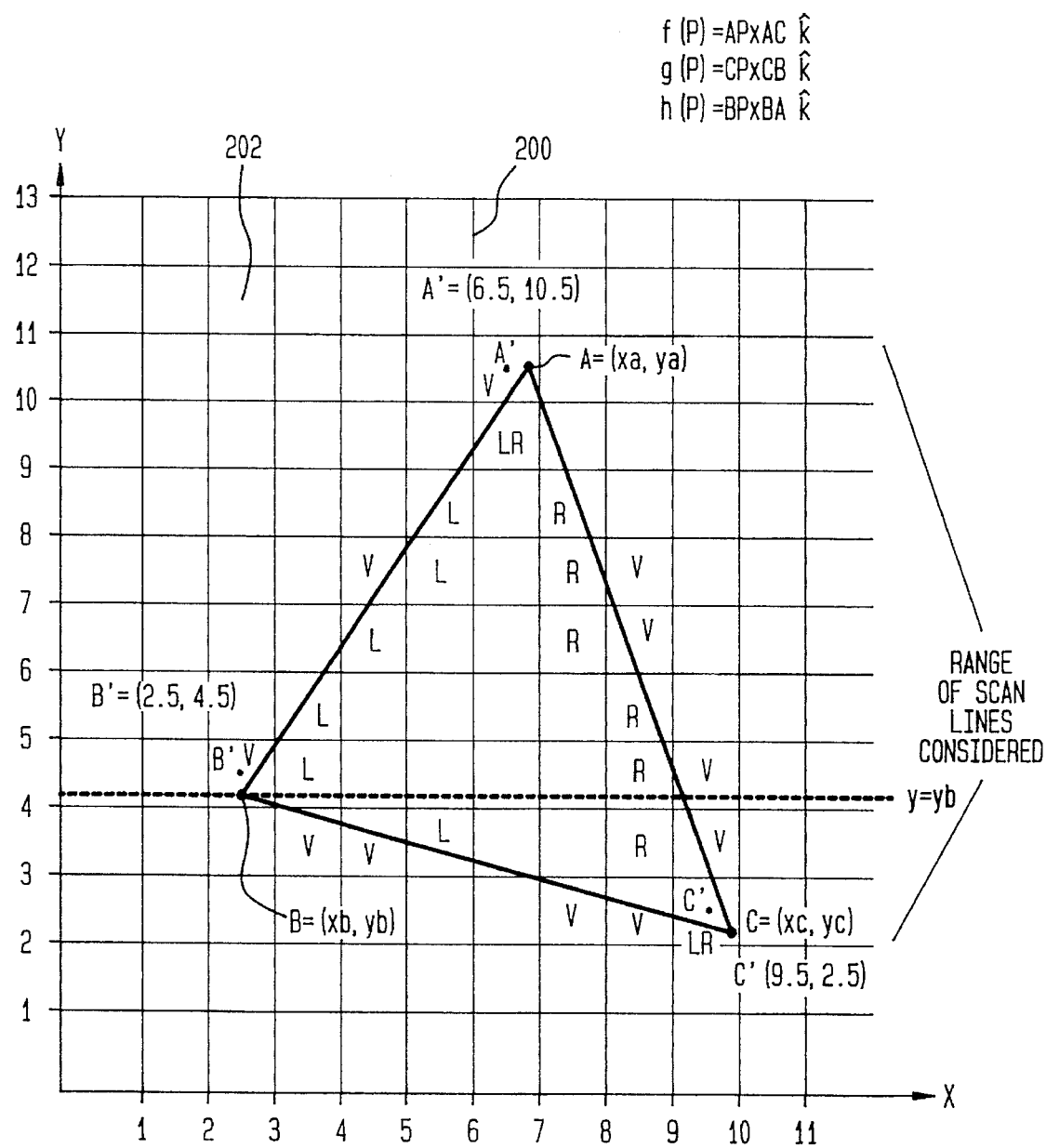
FIG. 6 is an illustration of a triangle overlaid on a pixel grid with pixels identified as being inside and outside the triangle.

FIG. 6 depicts a triangle overlaid on a pixel grid showing how the above processes might work. The triangle ABC is overlaid on a pixel grid 200, with a pixel 202 being a typical pixel. The left end pixels, the pixels furthest to the left in the scan line which still have their center within the triangle are labelled with "L"; the right end pixels are labelled with "R", and pixels initially visited by a edge stepping algorithm which aren't end pixels are labelled "V".

The vertices A, B and C are the actual vertices of the triangle. A', B' and C' are the rounded vertices, and are equal to (6.5, 10.5), (2.5, 4.5) and (9.5, 2.5), respectively. It should be apparent that the rounded vertices can be made into whole numbers by shifting the arbitrary origin of the pixel coordinate system to the center of a pixel. Because the rounded vertices can be expressed in the pixel grid coordinate system as whole numbers, or whole numbers divided by 2, the characteristic functions based on those rounded vertices can be calculated exactly for each pixel center. For example:

$$f(x,y)=(x-6.5)(2.5-10.5)-(y-10.5)(9.5-6.5)=-8x-3y+83.5,$$

$$g(x,y)=(X-9.5)(4.5-2.5)-(y-2.5)(2.5-9.5)=2x+7y-36.5,$$

$$h(x,y)=(x-2.5)(10.5-4.5)-(y-4.5)(6.5-2.5)=6x-4y+3.0,$$

each of which can be calculated exactly when x and y are whole numbers or whole numbers divided by two. The use of characteristic functions will be described with respect to the scan line of pixels between y=6 and y=7, which is referred to as scan line 6. A simple edge interpolation algorithm will indicate that the pixels in scan line 6 labeled L and V are the pixels nearest the left edge (AB) and the right edge (AC) respectively. The coordinates for the centers of these pixels are L=(4.5, 6.5) and V=(8.5, 6.5). The characteristic functions used for this scan line are f(x,y) and h(x,y). For the pixel L=(4.5, 6.5), f(L)=-8(4.5)-3(6.5)+83.5, or 28.0, and h(L)=6(4.5)-4(6.5)+3.0, or 4.0, and for the pixel V=(8.5, 6.5), f(V)=-8(8.5)-3(6.5)+83.5, or -4.0, and h(V)= 6(8.5)-4(6.5)+3.0, or 28.0. Since f(L) and h(L) have the same sign, the point L is inside ABC, but since f(V) and h(V) do not have the same sign, V is outside ABC. If only one characteristic function is used per edge, it would be sufficient to calculate h(L) and f(V), and checking that V is not to the left of L. Since V is outside the triangle, the pixel labelled "R" to the left of the pixel "V" is the right end pixel for that scan line.

The end pixels found without using any characteristic edge functions are found from the incremental calculation of the closest pixels to the two edges crossing a scan line. If the closest pixels are to the left of an edge which is a left edge or to the right of a right edge, the next pixel is taken as the end pixel.

Many variations of the invention will become apparent to those of skill in the art upon review of this disclosure. The scope of the invention should, therefore, be determined not with reference to the above description, but instead should be determined with reference to the appended claims along with their full scope of equivalents.

Appendix A:Triangle Renderer with Two Characteristic Functions per Edge Pixel Prospect
Procedure Triangle(xa',ya',za,Ia,xb',yb',zb,Ib,xc',yc',zc,Ic)

```
xa',ya',za,Ia,xb',yb',zb,Ib,xc',yc',zc,Ic:=float
δz/δx,δz/δy,δI/δx,δI/δy:=float
xa,ya,xb,yb,xc,yc,f1,f2,f3,g1,g2,g3,h1,h2,h3:=int
slope_AB,slope_BC,slope_AC:=float
z,I:=array[1 to n] of float              //f,g,h=characteristic functions for left edge//
f,g,h,F,G,H:=array[1 to n] of int        //F,G,H=characteristic functions for right edge//
x,X,y:=array[1 to n] of float            //f,F associated to AC, g,G to BC and h,H to AB//
x_e:=array[1 to n] of float              //exact x coordinate on the left edge//
X_e:=array[1 to n] of float              //exact x coordinate on the right edge//
flag_AB:=[left_edge,right_edge]

Begin {Triangle} xa=int(xa')
ya=int(ya')
xb=int(xb')
yb=int(yb')
xc=int(xc')
yc=int(yc')
Sort(xa,ya,xb,yb,xc,yc,slope_AB,Slope_BC,slope_AC,flag_AB,Flag_BC,flag_AC)
// Arrange such that vertex A is on top and C is at the bottom // f1=yc-ya   // If x varies by dx then f(x,y) varies by f1*dx //
f2=xa-xc   // If y varies by dy then f(x,y) varies by f2*dy //
f3=xa(ya-yc)+ya(xc-xa)=-(f1*xa+f2*ya)
g1=yb-yc   // If x varies by dx then g(x,y) varies by g1*dx //
g2=xc-xb   // If y varies by dy then g(x,y) varies by g2*dy //
g3=xc(yc-yb)+yc(xb-xc)=-(g1*xc+g2*yc)
h1=ya-yb   // If x varies by dx then h(x,y) varies by h1*dx //
h2=xb-xa   // If y varies by dy then h(x,y) varies by h2*dy //
h3=xb(yb-ya)+yb(xa-xb)=-(h1*xb+h2*yb)
a=-(za*g1+zb*f1+zc*h1)
b=-(za*g2+zb*f2+zc*h2)
r=c=xa*g1+xb*f1+xc*h1
p=-(Ia*g1+Ib*f1+Ic*h1)
q=-(Ia*g2+Ib*f2+Ic*h2)
δz/δx=-a/c     δz/δy=-b/c
δI/δx=-p/r     δI/δy=-q/r
x(1)=xa+.5           // Find out if the center of the pixel A is inside the triangle //
y(1)=ya+.5
x_e(1)=xa
X_e(1)=xa
dx=x(1)-xa
dy=y(1)-ya
z(1)=za+δz/δx*dx+δz/δy*dy    //adjust z and rgb for the fact that the interpolation //
I(1)=Ia+δI/δx*dx+δI/δy*dy    //starts in (x(1),y(1)) and not in (xa,ya)//
X(1)=x(1)              // value used for interpolating edge AC //
f(1)=f(x(1),y(1))=f1*x(1)+f2*y(1)+f3  // Calculate the initial values of the
h(1)=h(x(1),y(1))=h1*x(1)+h2*y(1)+h3   characteristic functions f,h for the top half//
G(1)=g(x(1),y(1))=g1*x(1)+g2*y(1)+g3  // g intervenes only in the bottom half//
F(1)=f(1)
H(1)=h(1)
No_of_TopRows=ya-yb+1   //Count the number of spans for the top of the
                                                                    // triangle//
No_of_Rows=ya-yc+1   //Count the total number of spans of the triangle//

// Run a modified DDA along the edge AB (from A to B) and on the edge AC and record
the values of the f and h functions as well as the leftmost (rightmost) pixel visited
by the algorithm into an array that has exactly No_of_TopRows elements.Note that if
AB=left_edge then BC=left_edge & AC=right_edge Else If AB=right_edge Then
BC=right_edge & AC=left_edge//
```

```
If flag_AB=left_edge Then    //AB=left top edge//
Begin
  For i=1 to No_of_TopRows-1 Do
  Begin
    //AB=left top edge//
    If [sign(f(i))<>sign(h(i))] Then
    Begin                        //Adjust such that we are inside //
                                 //walk to the next pixel to the right //
        x(i)=x(i)+1              //new x(i) inside the triangle//
        f(i)=f(i)+f1             //adjust the characteristics//
        h(i)=h(i)+h1
        z=z+δz/δx                //adjust z //
        I=I+δI/δx                //adjust the color //
    End
    x_e(i+1)=x_e(i)-slope_AB     //compute the fractional x address//
    x(i+1)=int[x_e(i+1)]+.5
    dx=x(i+1)-x(i)               //delta between integer addresses//
    f(i+1)=f(i)+f1*dx-f2         //recompute the characteristics //
    h(i+1)=h(i)+h1*dx-h2
    z(i+1)=z(i)+δz/δx*dx-δz/δy   //calculate the new z value//
    I(i+1)=I(i)+δI/δx*dx-δI/δy   //calculate the new rgb value//
    //AC=top right edge//
    If [sign(F(i))<>sign(H(i)) OR F(i)=0]  //Pixels centered on the right edge are
                                            //not drawn//
    Begin                        //Adjust such that we are inside //
                                 //walk to the next pixel to the right //
        X(i)=X(i)-1              //new x(i) inside the triangle//
        F(i)=F(i)-f1             //adjust the characteristics//
        H(i)=H(i)-h1             //No color or z malong the right edge//
        G(i)=G(i)-g1
    End
    X_e(i+1)=X_e(i)-slope_AC     //compute the fractional x address//
    X(i+1)=int[X_e(i+1)]+.5
    dX=X(i+1)-X(i)               //delta between integer addresses//
    F(i+1)=F(i)+f1*dX-f2         //recompute the characteristics //
    H(i+1)=H(i)+h1*dX-h2
    G(i+1)=G(i)+g1*dX-g2
  End {For}

// Now run a modified DDA along the edge BC (from B to C) and on edge AC and record
the values of the g and h functions as well as the leftmost (rightmost) pixel visited
by the algorithm into an array that has exactly No_of_BottomRows elements// y(No_of_TopRows)=yb+0.5
g(No_of_TopRows)=g[x(No_of_TopRows),y(No_of_TopRows)]=
  =g1*x(No_of_TopRows)+g2*y(No_of_TopRows)+g3   //initialize the g function //

For i=No_of_TopRows to No_of_Rows Do
Begin
    //BC=left bottom edge//
    If [sign(g(i))<>sign(f(i))] Then
    Begin                        //Adjust such that we are inside //
                                 //walk to the next pixel to the right //
        x(i)=x(i)+1              //new x(i) inside the triangle//
        g(i)=g(i)+g1             //adjust the characteristics//
        f(i)=f(i)+f1
        z=z+δz/δx                //adjust z //
        I=I+δI/δx                //adjust the color //
    End
    x_e(i+1)=x_e(i)-slope_BC     //compute the fractional x address//
    x(i+1)=int[x_e(i+1)]+.5
    dx=x(i+1)-x(i)               //delta between integer addresses//
    g(i+1)=g(i)+g1*dx-g2         //recompute the characteristics //
    f(i+1)=f(i)+f1*dx-f2
    z(i+1)=z(i)+δz/δx*dx-δz/δy   //calculate the new z value//
```

```
   I(i+1)=I(i)+δI/δx*dx-δI/δy        //calculate the new rgb value//
//AC= right bottom edge//
   If [sign(G(i))<>sign(F(i)) OR F(i)=0] //Pixels centered on the right edge are
                                                                //not drawn//
     Begin                        //Adjust such that we are inside //
                                  //walk to the next pixel to the right //
         X(i)=X(i)-1              //new x(i) inside the triangle//
         G(i)=G(i)-g1             //adjust the characteristics//
         F(i)=F(i)-f1             //No color or z malong the right edge//
     End
     X_e(i+1)=X_e(i)-slope_AC           //compute the fractional x address//
     X(i+1)=int[X_e(i+1)]+.5
     dX=X(i+1)-X(i)                     //delta between integer addresses//
     G(i+1)=G(i)+g1*dX-g2               //recompute the characteristics //
     F(i+1)=F(i)+f1*dX-f2
   End {For}
End Else
//AB=right top edge//
Begin
   For i=1 to No_of_TopRows-1 Do
   Begin
   //AB=top right edge//
     If [sign(F(i))<>sign(H(i)) OR H(i)=0] //Pixels centered on the right edge are
                                                                //not drawn//
       Begin                      //Adjust such that we are inside //
                                  //walk to the next pixel to the right //
           X(i)=X(i)-1            //new x(i) inside the triangle//
           F(i)=F(i)-f1           //adjust the characteristics//
           H(i)=H(i)-h1           //No color or z malong the right edge//
       End
       X_e(i+1)=X_e(i)-slope_AB         //compute the fractional x address//
       X(i+1)=int[X_e(i+1)]+.5
       dX=X(i+1)-X(i)                   //delta between integer addresses//
       F(i+1)=F(i)+f1*dX-f2             //recompute the characteristics //
       H(i+1)=H(i)+h1*dX-h2
   //AC=top left edge//
     If [sign(f(i))<>sign(h(i))] Then
       Begin                      //Adjust such that we are inside //
                                  //walk to the next pixel to the right //
           x(i)=x(i)+1            //new x(i) inside the triangle//
           f(i)=f(i)+f1           //adjust the characteristics//
           h(i)=h(i)+h1
           z=z+δz/δx              //adjust z //
           I=I+δI/δx              //adjust the color //
       End
       x_e(i+1)=x_e(i)-slope_AC         //compute the fractional x address//
       x(i+1)=int[x_e(i+1)]+.5
       dx=x(i+1)-x(i)                   //delta between integer addresses//
       f(i+1)=f(i)+f1*dx-f2             //recompute the characteristics //
       h(i+1)=h(i)+h1*dx-h2
       z(i+1)=z(i)+δz/δx*dx-δz/δy       //calculate the new z value//
       I(i+1)=I(i)+δI/δx*dx-δI/δy       //calculate the new rgb value//
   End {For} y(No_of_TopRows)=yb+0.5
g(No_of_TopRows)=g[x(No_of_TopRows),y(No_of_TopRows)]=
  =g1*x(No_of_TopRows)+g2*y(No_of_TopRows)+g3   //initialize the g function //
G(No_of_TopRows)=g(No_of_TopRows)               //initialize the G function//

// Run a modified DDA along the edge BC (from B to C) and on edge AC and record the
values of the g and h functions as well as the leftmost (rightmost) pixel visited by
the algorithm into an array that has exactly No_of_BottomRows elements//

For i=No_of_TopRows to No_of_Rows Do
Begin
```

```
//BC=bottom right edge//
    If [sign(G(i))<>sign(F(i)) OR G(i)=0]   //Pixels centered on the right edge are
                                            //not drawn//
    Begin                       //Adjust such that we are inside //
                                //walk to the next pixel to the right //
         X(i)=X(i)-1            //new x(i) inside the triangle//
         G(i)=G(i)-g1           //adjust the characteristics//
         F(i)=F(i)-f1           //No color or z malong the right edge//
    End
    X_e(i+1)=X_e(i)-slope_BC    //compute the fractional x address//
    X(i+1)=int[X_e(i+1)]+.5
    dX=X(i+1)-X(i)              //delta between integer addresses//
    G(i+1)=G(i)+g1*dX-g2        //recompute the characteristics //
    F(i+1)=F(i)+f1*dX-f2
//AC= bottom left edge//
    If [sign(g(i))<>sign(f(i))] Then
    Begin                       //Adjust such that we are inside //
                                //walk to the next pixel to the right //
         x(i)=x(i)+1            //new x(i) inside the triangle//
         f(i)=f(i)+f1           //adjust the characteristics//
         g(i)=g(i)+g1
         z=z+δz/δx              //adjust z //
         I=I+δI/δx              //adjust the color //
    End
    x_e(i+1)=x_e(i)-slope_AC    //compute the fractional x address//
    x(i+1)=int[x_e(i+1)]+.5
    dx=x(i+1)-x(i)              //delta between integer addresses//
    g(i+1)=g(i)+g1*dx-g2        //recompute the characteristics //
    f(i+1)=f(i)+f1*dx-f2
    z(i+1)=z(i)+δz/δx*dx-δz/δy  //calculate the new z value//
    I(i+1)=I(i)+δI/δx*dx-δI/δy  //calculate the new rgb value//
  End {For}
End {If flag_AB=...}

For i=1 to No_of_Rows Do  //Draw the horizontal spans//
  Begin
         z=z(i)             //z_span and I_span are local variables that get initialized//
         I=I(i)             //for every span//
         For x=x(i) to X(i) Do   //Draw the pixels betwen x(i) and X(i)//
         Begin                   //y(i) is obviously constant along the span//
              Write_Pixel(x,y(i),z,I)
              z=z+δz/δx                  //iterate z along the span//
              I=I+δI/δx                  //iterate the color along the span//
         End
         y(i+1)=y(i)-1              //iterate the raster number//
  End
End {Triangle}

Procedure Write_Pixel (x,y,z,I)
Begin
         Read(x,y,background,z_buffer)   //Read contents of location (x,y) //
         If z =< z_buffer Then
         Begin
           new_color=I
           Write(x,y,new_color)
         End
End Procedure Sort(xa,ya,xb,yb,xc,yc,slope_AB,Slope_BC,slope_AC,flag_AB)
Begin //Sort the vertices such that ya>yb>yc.The cases ya=yb, yb=yc are treated specially //
         If ya>yb>yc Then
         Begin
                  slope_AB=(xa-xb)/(ya-yb)
```

```
                slope_BC=(xb-xc)/(yb-yc)
                slope_AC=(xa-xc)/(ya-yc)
                If slope_BC<slope_AC Then
                Begin
                        flag_AB=left_edge
                End Else
                Begin
                        flag_AB=right_edge
                End
        End
        If ya=yb Then     //No_of_Top_Rows=1 , only one row on the triangle top//
        Begin
                slope_BC=(xb-xc)/(yb-yc)
                slope_AC=(xa-xc)/(ya-yc)
                If xa<xb Then
                Begin
                        flag_AB=left_edge
                End Else
                Begin
                        flag_AB=right_edge
                End
        End
        If yb=yc Then   //No_of_Bottom_Rows=1 ,only one row on the triangle bottom//
        Begin
                slope_AB=(xa-xb)/(ya-yb)
                slope_AC=(xa-xc)/(ya-yc)
                If xb<xc Then
                Begin
                        flag_AB=left_edge
                End Else
                Begin
                        flag_AB=right_edge
                End
        End
End.
```

Appendix B:Triangle Renderer with One Characteristic Function per Edge Pixel Prospect
Procedure Triangle(xa',ya',za,Ia,xb',yb',zb,Ib,xc',yc',zc,Ic)

```
xa',ya',za,Ia,xb',yb',zb,Ib,xc',yc',zc,Ic:=float
δz/δx,δz/δy,δI/δx,δI/δy:=float
f1,f2,f3,g1,g2,g3,h1,h2,h3,xa,ya,xb,yb,xc,yc:=int
slope_AB,slope_BC,slope_AC:=float
f,g,h:=array[1 to n] of int         //f,g,h=characteristic for AC,BC,AB//
x,X,y,z,I:=array[1 to n] of float   //f associated to AC, g to BC and h to AB//
x_e:=array[1 to n] of float         //exact x coordinate on the left edge//
X_e:=array[1 to n] of float         //exact x coordinate on the right edge//
flag_AB:=[left_edge,right_edge]

Begin {Triangle} xa=int(xa')
ya=int(ya')
xb=int(xb')
yb=int(yb')
xc=int(xc')
yc=int(yc')

Sort(xa,ya,xb,yb,xc,yc,slope_AB,Slope_BC,slope_AC,flag_AB,Flag_BC,flag_AC)
        // Arrange such that vertex A is on top and C is at the bottom  //
f1=yc-ya   // If x varies by dx then f(x,y) varies by f1*dx //
f2=xa-xc   // If y varies by dy then f(x,y) varies by f2*dy //
f3=xa(ya-yc)+ya(xc-xa)=-(f1*xa+f2*ya)
g1=yb-yc   // If x varies by dx then g(x,y) varies by g1*dx //
g2=xc-xb   // If y varies by dy then g(x,y) varies by g2*dy //
g3=xc(yc-yb)+yc(xb-xc)=-(g1*xc+g2*yc)
h1=ya-yb   // If x varies by dx then h(x,y) varies by h1*dx //
h2=xb-xa   // If y varies by dy then h(x,y) varies by h2*dy //
h3=xb(yb-ya)+yb(xa-xb)=-(h1*xb+h2*yb)
a=-(za*g1+zb*f1+zc*h1)
b=-(za*g2+zb*f2+zc*h2)
r=c=xa*g1+xb*f1+xc*h1
p=-(Ia*g1+Ib*f1+Ic*h1)
q=-(Ia*g2+Ib*f2+Ic*h2)
δz/δx=-a/c    δz/δy=-b/c
δI/δx=-p/r    δI/δy=-q/r
x(1)=xa+.5         // Find out if the center of the pixel A is inside the triangle //
y(1)=ya+.5
x_e(1)=xa
X_e(1)=xa
dx=x(1)-xa
dy=y(1)-ya
z(1)=za+δz/δx*dx+δz/δy*dy   //adjust z and rgb for the fact that the interpolation //
I(1)=Ia+δI/δx*dx+δI/δy*dy   //starts in (x(1),y(1)) and not in (xa,ya)//
X(1)=x(1)           // value used for interpolating edge AC //
f(1)=f(x(1),y(1))=f1*x(1)+f2*y(1)+f3  // Calculate the initial values of the
h(1)=h(x(1),y(1))=h1*x(1)+h2*y(1)+h3  characteristic functions f,h for the top half//
                                      // g intervenes only in the bottom half//
No_of_TopRows=ya-yb+1  //Count the number of spans for the top of the
                                                        // triangle//
No_of_Rows=ya-yc+1   //Count the total number of spans //

// Run a modified DDA along the edge AB (from A to B) and on the edge AC and record
the values of the f and h functions as well as the leftmost (rightmost) pixel visited
by the algorithm into an array that has exactly No_of_TopRows elements.Note that if
AB=left_edge then BC=left_edge & AC=right_edge Else If AB=right_edge Then
BC=right_edge & AC=left_edge//
If flag_AB=left_edge Then    //AB=left top edge//
Begin
  For i=1 to No_of_TopRows-1 Do
  Begin
  //AB=left top edge//
```

```
    If h(i)<0 Then
    Begin                       //Adjust such that we are inside //
                                //walk to the next pixel to the right //
            x(i)=x(i)+1         //new x(i) inside the triangle//
            h(i)=h(i)+h1
            z=z+δz/δx            //adjust z //
            I=I+δI/δx            //adjust the color //
    End
    x_e(i+1)=x_e(i)-slope_AB    //compute the fractional x address//
    x(i+1)=int[x_e(i+1)]+.5
    dx=x(i+1)-x(i)              //delta between integer addresses//
    h(i+1)=h(i)+h1*dx-h2
    z(i+1)=z(i)+δz/δx*dx-δz/δy   //calculate the new z value//
    I(i+1)=I(i)+δI/δx*dx-δI/δy   //calculate the new rgb value//
    //AC=top right edge//
    If f(i)=<0                  //Pixels centered on the right edge are not drawn//
    Begin                       //Adjust such that we are inside //
                                //walk to the next pixel to the right //
            X(i)=X(i)-1         //new x(i) inside the triangle//
            f(i)=f(i)-f1        //adjust the characteristics//
                                //No color or z malong the right edge//
    End
    X_e(i+1)=X_e(i)-slope_AC    //compute the fractional x address//
    X(i+1)=int[X_e(i+1)]+.5
    dX=X(i+1)-X(i)              //delta between integer addresses//
    f(i+1)=f(i)+f1*dX-f2        //recompute the characteristics //
End {For}

// Now run a modified DDA along the edge BC (from B to C) and on edge AC and record
the values of the g and h functions as well as the leftmost (rightmost) pixel visited
by the algorithm into an array that has exactly No_of_BottomRows elements// y(No_of_TopRows)=yb+.5
g(No_of_TopRows)=g[x(No_of_TopRows),y(No_of_TopRows)]=
 =g1*x(No_of_TopRows)+g2*y(No_of_TopRows)+g3   //initialize the g function //

For i=No_of_TopRows to No_of_Rows Do
Begin
    //BC=left bottom edge//
    If g(i))<0 Then
    Begin                       //Adjust such that we are inside //
                                //walk to the next pixel to the right //
            x(i)=x(i)+1         //new x(i) inside the triangle//
            g(i)=g(i)+g1        //adjust the characteristics//
            z=z+δz/δx            //adjust z //
            I=I+δI/δx            //adjust the color //
    End
    x_e(i+1)=x_e(i)-slope_BC    //compute the fractional x address//
    x(i+1)=int[x_e(i+1)]+.5
    dx=x(i+1)-x(i)              //delta between integer addresses//
    g(i+1)=g(i)+g1*dx-g2        //recompute the characteristics //
    z(i+1)=z(i)+δz/δx*dx-δz/δy   //calculate the new z value//
    I(i+1)=I(i)+δI/δx*dx-δI/δy   //calculate the new rgb value//
    //AC= right bottom edge//
    If f(i)=<0                  //Pixels centered on the right edge are not drawn//
    Begin                       //Adjust such that we are inside //
                                //walk to the next pixel to the right //
            X(i)=X(i)-1         //new x(i) inside the triangle//
            f(i)=f(i)-f1        //No color or z malong the right edge//
    End
    X_e(i+1)=X_e(i)-slope_AC    //compute the fractional x address//
    X(i+1)=int[X_e(i+1)]+.5
    dX=X(i+1)-X(i)              //delta between integer addresses//
    f(i+1)=f(i)+f1*dX-f2
End {For}
```

```
End Else
//AB=right top edge//
Begin
  For i=1 to No_of_TopRows-1 Do
  Begin
  //AB=top right edge//
    If h(i)=<0              //Pixels centered on the right edge are not drawn//
    Begin                   //Adjust such that we are inside //
                            //walk to the next pixel to the right //
        X(i)=X(i)-1         //new x(i) inside the triangle//
        h(i)=h(i)-h1        //No color or z malong the right edge//
    End
    X_e(i+1)=X_e(i)-slope_AB        //compute the fractional x address//
    X(i+1)=int[X_e(i+1)]+.5
    dX=X(i+1)-X(i)                  //delta between integer addresses//
    h(i+1)=h(i)+h1*dX-h2
  //AC=top left edge//
    If f(i))<0 Then
    Begin                   //Adjust such that we are inside //
                            //walk to the next pixel to the right //
        x(i)=x(i)+1         //new x(i) inside the triangle//
        f(i)=f(i)+f1        //adjust the characteristics//
        z=z+δz/δx           //adjust z //
        I=I+δI/δx           //adjust the color //
    End
    x_e(i+1)=x_e(i)-slope_AC        //compute the fractional x address//
    x(i+1)=int[x_e(i+1)]+.5
    dx=x(i+1)-x(i)                  //delta between integer addresses//
    f(i+1)=f(i)+f1*dx-f2            //recompute the characteristics //
    z(i+1)=z(i)+δz/δx*dx-δz/δy      //calculate the new z value//
    I(i+1)=I(i)+δI/δx*dx-δI/δy      //calculate the new rgb value//
  End {For}
y(No_of_TopRows)=yb+.5
g(No_of_TopRows)=g[x(No_of_TopRows),y(No_of_TopRows)]=
  =g1*x(No_of_TopRows)+g2*y(No_of_TopRows)+g3   //initialize the g function //

// Run a modified DDA along the edge BC (from B to C) and on edge AC and record the
values of the g and h functions as well as the leftmost (rightmost) pixel visited by
the algorithm into an array that has exactly No_of_BottomRows elements//
For i=No_of_TopRows to No_of_Rows Do
Begin
  //BC=bottom right edge//
    If  g(i)=<0             //Pixels centered on the right edge are not drawn//
    Begin                   //Adjust such that we are inside //
                            //walk to the next pixel to the right //
        X(i)=X(i)-1         //new x(i) inside the triangle//
        g(i)=g(i)-g1        //adjust the characteristics//
    End
    X_e(i+1)=X_e(i)-slope_BC        //compute the fractional x address//
    X(i+1)=int[X_e(i+1)]+.5
    dX=X(i+1)-X(i)                  //delta between integer addresses//
    g(i+1)=g(i)+g1*dX-g2            //recompute the characteristics //
  //AC= bottom left edge//
    If f(i)<0 Then
    Begin                   //Adjust such that we are inside //
                            //walk to the next pixel to the right //
        x(i)=x(i)+1         //new x(i) inside the triangle//
        f(i)=f(i)+f1        //adjust the characteristics//
        z=z+δz/δx           //adjust z //
        I=I+δI/δx           //adjust the color //
    End
    x_e(i+1)=x_e(i)-slope_AC        //compute the fractional x address//
    x(i+1)=int[x_e(i+1)]+.5
    dx=x(i+1)-x(i)                  //delta between integer addresses//
    f(i+1)=f(i)+f1*dx-f2
```

```
    z(i+1)=z(i)+δz/δx*dx-δz/δy       //calculate the new z value//
    I(i+1)=I(i)+δI/δx*dx-δI/δy       //calculate the new rgb value//
  End {For}
End {If flag_AB=...}
  For i=1 to No_of_Rows Do  //Draw the horizontal spans//
  Begin
        z=z(i)           //z_span and I_span are local variables that get initialized//
        I=I(i)                            //for every span//
        For x=x(i) to X(i) Do           //Draw the pixels betwen x(i) and X(i)//
        Begin                          //y(i) is obviously constant along the span//
                Write_Pixel(x,y(i),z,I)
                z=z+δz/δx                //iterate z along the span//
                I=I+δI/δx                //iterate the color along the span//
        End
        y(i+1)=y(i)-1                  //iterate the raster number//
  End
End {Triangle}
Procedure Write_Pixel (x,y,z,I)
Begin
        Read(x,y,background,z_buffer)    //Read contents of location (x,y) //
        If z =< z_buffer Then
        Begin
          new_color=I
          Write(x,y,new_color)
        End
End
Procedure Sort(xa,ya,xb,yb,xc,yc,slope_AB,Slope_BC,slope_AC,flag_AB)
Begin
//Sort the vertices such that ya>yb>yc.The cases ya=yb, yb=yc are treated specially //
        If ya>yb>yc Then
        Begin
                slope_AB=(xa-xb)/(ya-yb)
                slope_BC=(xb-xc)/(yb-yc)
                slope_AC=(xa-xc)/(ya-yc)
                If slope_BC<slope_AC Then
                Begin
                        flag_AB=left_edge
                End Else
                Begin
                        flag_AB=right_edge
                End
        End
        If ya=yb Then     //No_of_Top_Rows=1 , only one row on the triangle top//
        Begin
                slope_BC=(xb-xc)/(yb-yc)
                slope_AC=(xa-xc)/(ya-yc)
                If xa<xb Then
                Begin
                        flag_AB=left_edge
                End Else
                Begin
                        flag_AB=right_edge
                End
        End
        If yb=yc Then   //No_of_Bottom_Rows=1 ,only one row on the triangle bottom//
        Begin
                slope_AB=(xa-xb)/(ya-yb)
                slope_AC=(xa-xc)/(ya-yc)
                If xb<xc Then
                Begin
                        flag_AB=left_edge
                End Else
                Begin
                        flag_AB=right_edge
                End
```

Appendix C: Triangle Renderer with No Caracteristic Functions
Procedure Triangle(xa,ya,za,Ia,xb,yb,zb,Ib,xc,yc,zc,Ic)

```
xa,ya,za,Ia,xb,yb,zb,Ib,xc,yc,zc,Ic:=float
δz/δx,δz/δy,δI/δx,δI/δy:=float
slope_AB,slope_BC,slope_AC:=float
z,I:=array[1 to n] of float
x,X,y:=array[1 to n] of float
x_e:=array[1 to n] of float          //exact x coordinate on the left edge//
X_e:=array[1 to n] of float          //exact x coordinate on the right edge//
flag_AB:=[left_edge,right_edge]

Begin {Triangle}

//Sort the vertices such that ya>yb>=yc.The case ya=yb is treated specially //

No_of_TopRows=round(ya)-round(yb)   //Number of spans for the top of the triangle//
No_of_BottomRows=round(yb)-round(yc) //Count the bottom number of spans //
//Using round(ya) ensures that the span y=ya gets rendered by the top triangle   //
//only if frac(ya)>.5//
//Using round(yb) ensures that the span yb gets rendered by the top triangle if //
//frac(yb)<.5 or by the bottom triangle if frac(yb)>=.5//
//Using round(yc) ensures that the span y=yc gets rendered by the bottom triangle //
//only if frac(yc)>.5// f1=yc-ya
f2=xa-xc
g1=yb-yc
g2=xc-xb
h1=ya-yb
h2=xb-xa
a=za*g1+zb*f1+zc*h1
b=za*g2+zb*f2+zc*h2
inv_c=1/(xa*g1+xb*f1+xc*h1)
p=Ia*g1+Ib*f1+Ic*h1
q=Ia*g2+Ib*f2+Ic*h2
δz/δx=a*inv_c     δz/δy=b*inv_c
δI/δx=p*inv_c     δI/δy=q*inv_c If ya>yb Then
Begin
        slope_AC=(xa-xc)/(ya-yc)=-f2/f1
        slope_AB=(xa-xb)/(ya-yb)=-h2/h1
        If yb=yc Then
        Begin                                       //yb=yc//
                If g2>0 Then                        //xb<xc//
                Begin
                  flag_AB=left_edge
                  If frac(ya)>=0.5 Then    //The top row is rendered only if
                                           //frac(ya)>0.5//
                  Begin            //Only then the vertex is above the .5 line//
                    x_e(1)=xa+[.5-frac(ya)]*slope_AB  //use slope_AB for left edge//
                    X_e(1)=xa+[.5-frac(ya)]*slope_AC  //use slope_AC for right//
                    y(1)=int(ya)+.5
                  End Else                 //advance one row lower//
                  Begin
                    x_e(1)=xa+[.5-frac(ya)]*slope_AB-slope_AB
                    X_e(1)=xa+[.5-frac(ya)]*slope_AC-slope_AC
                    y(1)=int(ya)-.5
                  End
                End Else                            //xb>xc//
                Begin
                  flag_AB=right_edge
                  If frac(ya)>=0.5 Then
                  Begin
                    x_e(1)=xa+[.5-frac(ya)]*slope_AC  //use slope_AC for left edge//
```

```
                        X_e(1)=xa+[.5-frac(ya)]*slope_AB  //use slope_AB for right //
                        y(1)=int(ya)+.5
                      End Else              //advance to one row lower//
                      Begin
                        x_e(1)=xa+[.5-frac(ya)]*slope_AC-slope_AC
                        X_e(1)=xa+[.5-frac(ya)]*slope_AB-slope_AB
                        y(1)=int(ya)-.5
                      End
                    End {If g2>0}
              End Else                                    //yb>yc//
              Begin
                    slope_BC=(xb-xc)/(yb-yc)=-g2/g1
                    If slope_BC<slope_AC Then
                    Begin
                      flag_AB=left_edge
                      If frac(ya)>=0.5 Then       //The top row is rendered only if
                                                  //frac(ya)>0.5//
                      Begin           //Only then the vertex is above the .5 line//
                        x_e(1)=xa+[.5-frac(ya)]*slope_AB  //use slope_AB for left edge//
                        X_e(1)=xa+[.5-frac(ya)]*slope_AC  //use slope_AC for right//
                        y(1)=int(ya)+.5
                      End Else              //advance one row lower//
                      Begin
                        x_e(1)=xa+[.5-frac(ya)]*slope_AB-slope_AB
                        X_e(1)=xa+[.5-frac(ya)]*slope_AC-slope_AC
                        y(1)=int(ya)-.5
                      End
                    End Else
                    Begin
                      flag_AB=right_edge
                      If frac(ya)>=0.5 Then
                      Begin
                        x_e(1)=xa+[.5-frac(ya)]*slope_AC  //use slope_AC for left edge//
                        X_e(1)=xa+[.5-frac(ya)]*slope_AB  //use slope_AB for right //
                        y(1)=int(ya)+.5
                      End Else              //advance to one row lower//
                      Begin
                        x_e(1)=xa+[.5-frac(ya)]*slope_AC-slope_AC
                        X_e(1)=xa+[.5-frac(ya)]*slope_AB-slope_AB
                        y(1)=int(ya)-.5
                      End
                    End {If slope_BC<slope_AC}
              End (If yb=yc)
              x(1)=int(x_e(1))+.5
              X(1)=int(X_e(1))+.5
              dx=x(1)-xa
              dy=y(1)-ya
              z(1)=za+δz/δx*dx+δz/δy*dy    //adjust z and rgb such that the interpolation //
              I(1)=Ia+δI/δx*dx+δI/δy*dy    //starts in (x(1),y(1)) and not in (xa,ya)//
End (If ya>yb)

If ya=yb Then    //No_of_Top_Rows=0 ,only one or zero rows on the triangle top//
Begin
        slope_BC=(xb-xc)/(yb-yc)=-g2/g1
        slope_AC=(xa-xc)/(ya-yc)=-f2/f1
        If xa > xb Then
        Begin
                flag_AB=left_edge            //xa>xb means AB & BC=left_edges!!//
        End Else
        Begin
                flag_AB=right_edge           //xa<xb means AB & BC=right_edges!!//
        End
End // Run a modified DDA along the edge AB (from A to B) and on the edge AC and record
``` the leftmost (rightmost) pixel visited by the algorithm into an array that has exactly
No_of_TopRows elements.Note that if AB=left_edge then BC=left_edge & AC=right_edge
Else If AB=rigt_edge Then BC=right_edge & AC=left_edge//

```
If flag_AB=left_edge Then    //AB=left top edge//
Begin
   For i=1 to No_of_TopRows Do      //last iteration is used for lower triangle//
   Begin
   //AB=left top edge//
      If frac(x_e(i))>0.5 Then
      Begin                     //Adjust such that we are inside //
                                //walk to the next pixel to the right //
            x(i)=x(i)+1         //new x(i) inside the triangle//
            z=z+δz/δx           //adjust z //
            I=I+δI/δx           //adjust the color //
      End
      x_e(i+1)=x_e(i)-slope_AB          //compute the fractional x address//
      x(i+1)=int[x_e(i+1)]+.5
      dx=x(i+1)-x(i)                    //delta between integer addresses//
      z(i+1)=z(i)+δz/δx*dx-δz/δy        //calculate the new z value//
      I(i+1)=I(i)+δI/δx*dx-δI/δy        //calculate the new rgb value//
   //AC=top right edge//
      If frac(X_e(i))=<0.5       //Pixels centered on the right edge are not drawn//
      Begin                     //Adjust such that we are inside //
                                //walk to the next pixel to the right //
            X(i)=X(i)-1         //new x(i) inside the triangle//
                                //No color or z malong the right edge//
      End
      X_e(i+1)=X_e(i)-slope_AC          //compute the fractional x address//
      X(i+1)=int[X_e(i+1)]+.5
   End {For}

For i=1 to No_of_TopRows Do               //Draw the top triangle//
   Begin
           z_span=z(i)     //z_span and I_span are local variables that get initialized//
           I_span=I(i)                //for every span//
           Begin
             For x=x(i) to X(i) Do   //Draw the pixels betwen x(i) and X(i)//
             Begin                   //y(i) is obviously constant along the span//
                    Write_Pixel(x,y(i),z_span,I_span)
                    z_span=z_span+δz/δx//iterate z along the span//
                    I_span=I_span+δI/δx//iterate the color along the span//
             End
             y(i+1)=y(i)-1                    //iterate the raster number//
           End
   End [For}
```

// Now run a modified DDA along the left edge BC (from B to C) and on the right edge
AC and record the leftmost (rightmost) pixel visited by the algorithm into an array
that has exactly No_of_BottomRows elements//
//Since there is a break on the left edge at B, we must reinitialize the variables//

```
If frac(yb)>=.5 Then       //Reinitialize left edge//
   Begin              //Since frac(yb)>.5 this row belongs to the bottom triangle//
        x_e(1)=xb+[.5-frac(yb)]*slope_BC     //Reinitialize left edge variables//
        x(1)=int(x_e(1))+.5
        y(1)=int(yb)+.5
        dx=x(1)-xb
        dy=y(1)-yb
        z(1)=zb+δz/δx*dx+δz/δy*dy             //adjust z and rgb //
        I(1)=Ib+δI/δx*dx+δI/δy*dy
        X_e(1)=X_e(No_of_TopRows+1)  //Use the value computed at the last iteration//
        X(1)=X(No_of_TopRows+1)         //by the top triangle//
End Else          //Since frac(yb)<.5 this row was rendered by the top triangle//
Begin             //We must advance to the next lower row//
```

```
        x_e(1)=xb+[.5-frac(yb)]*slope_BC-slope_BC      //one row lower//
        x(1)=int(x_e(1))+.5
        dx=x(1)-xb
        y(1)=int(yb)+.5-1=int(yb)-.5                   //one row lower//
        dy=y(1)-yb
        z(1)=zb+δz/δx*dx+δz/δy*dy        //adjust z and rgb //
        I(1)=Ib+δI/δx*dx+δI/δy*dy
        X_e(1)=X_e(No_of_TopRows+1)  //Use the value computed at the last iteration//
        X(1)=X(No_of_TopRows+1)      //by the top triangle//
End {if frac(yb)}

If ya=yb Then           //Flattop triangle with BC=left and AC=right edge//
Begin                   //Flattop triangles must initialize both edges//
        If frac(yb)>=.5 Then      //Reinitialize left edge//
        Begin              //Since frac(yb)>.5 this row belongs to the triangle//
          x_e(1)=xb+[.5-frac(yb)]*slope_BC    //Reinitialize left edge variables//
          x(1)=int(x_e(1))+.5
          y(1)=int(yb)+.5
          dx=x(1)-xb
          dy=y(1)-yb
          z(1)=zb+δz/δx*dx+δz/δy*dy          //adjust z and rgb //
          I(1)=Ib+δI/δx*dx+δI/δy*dy
          X_e(1)=xa+[.5-frac(ya)]*slope_AC
          X(1)=int(X_e(1))+.5
        End Else
        Begin      //Since frac(yb)<.5 only the next row belongs to the triangle//
          x_e(1)=xb+[.5-frac(yb)]*slope_BC-slope_BC
          x(1)=int(x_e(1))+.5
          y(1)=int(yb)+.5-1=int(yb)-.5
          dx=x(1)-xb
          dy=y(1)-yb
          z(1)=zb+δz/δx*dx+δz/δy*dy          //adjust z and rgb //
          I(1)=Ib+δI/δx*dx+δI/δy*dy
          X_e(1)=xa+[.5-frac(ya)]*slope_AC-slope_AC
          X(1)=int(X_e(1))+.5
        End
End {If ya=yb}

For i=1 to No_of_BottomRows Do
Begin
//BC=left bottom edge//
   If frac(x_e(i))>0.5 Then
   Begin                    //Adjust such that we are inside //
                            //walk to the next pixel to the right //
        x(i)=x(i)+1         //new x(i) inside the triangle//
        z=z+δz/δx           //adjust z //
        I=I+δI/δx           //adjust the color //
   End
   x_e(i+1)=x_e(i)-slope_BC          //compute the fractional x address//
   x(i+1)=int[x_e(i+1)]+.5
   dx=x(i+1)-x(i)                    //delta between integer addresses//
   z(i+1)=z(i)+δz/δx*dx-δz/δy        //calculate the new z value//
   I(i+1)=I(i)+δI/δx*dx-δI/δy        //calculate the new rgb value//
//AC= right bottom edge (also top right edge)//
   If frac(X_e(i))=<0.5    //Pixels centered on the right edge are not drawn//
   Begin                   //Adjust such that we are inside //
                           //walk to the next pixel to the right //
        X(i)=X(i)-1        //new x(i) inside the triangle//
   End
   X_e(i+1)=X_e(i)-slope_AC          //compute the fractional x address//
   X(i+1)=int[X_e(i+1)]+.5
End {For i=1 ..}

For i=1 to No_of_BottomRows Do               //Draw the bottom triangle//
Begin
```

```
            z_span=z(i)      //z_span and I_span are local variables that get initialized//
            I_span=I(i)                   //for every span//
            Begin
              For x=x(i) to X(i) Do     //Draw the pixels betwen x(i) and X(i)//
              Begin                      //y(i) is obviously constant along the span//
                    Write_Pixel(x,y(i),z_span,I_span)
                    z_span=z_span+δz/δx//iterate z along the span//
                    I_span=I_span+δI/δx//iterate the color along the span//
              End
            y(i+1)=y(i)-1                 //iterate the raster number//
          End
     End [For i=1 ...]

End Else {If flag_AB=left_edge...}

//AB=right top edge//
Begin
  For i=1 to No_of_TopRows Do
  Begin
    //AB=top right edge//
      If frac(X_e(i))=<0.5    //Pixels centered on the right edge are not drawn//
      Begin                   //Adjust such that we are inside //
                              //walk to the next pixel to the right //
            X(i)=X(i)-1       //new x(i) inside the triangle//
      End
      X_e(i+1)=X_e(i)-slope_AB        //compute the fractional x address//
      X(i+1)=int[X_e(i+1)]+.5
    //AC=top left edge//
      If frac(x_e(i))>0.5 Then
      Begin                   //Adjust such that we are inside //
                              //walk to the next pixel to the right //
            x(i)=x(i)+1       //new x(i) inside the triangle//
            z=z+δz/δx         //adjust z //
            I=I+δI/δx         //adjust the color //
      End
      x_e(i+1)=x_e(i)-slope_AC        //compute the fractional x address//
      x(i+1)=int[x_e(i+1)]+.5
      dx=x(i+1)-x(i)                  //delta between integer addresses//
      z(i+1)=z(i)+δz/δx*dx-δz/δy      //calculate the new z value//
      I(i+1)=I(i)+δI/δx*dx-δI/δy      //calculate the new rgb value//
  End {For}

For i=1 to No_of_TopRows Do              //Draw the top triangle//
  Begin
            z_span=z(i)      //z_span and I_span are local variables that get initialized//
            I_span=I(i)                   //for every span//
            Begin
              For x=x(i) to X(i) Do     //Draw the pixels betwen x(i) and X(i)//
              Begin                      //y(i) is obviously constant along the span//
                    Write_Pixel(x,y(i),z_span,I_span)
                    z_span=z_span+δz/δx//iterate z along the span//
                    I_span=I_span+δI/δx//iterate the color along the span//
              End
            y(i+1)=y(i)-1                 //iterate the raster number//
          End
     End [For]

// Run a modified DDA along the right edge BC (from B to C) and on the left edge AC
and record the the leftmost (rightmost) pixel visited by the algorithm into an array
that has exactly No_of_BottomRows elements//

If frac(yb)>=.5 Then
  Begin
            X_e(1)=xb+[.5-frac(yb)]*slope_BC       //Reinitialize right edge variables//
```

```
            X(1)=int(X_e(1))+.5
            y(1)=int(yb)+.5
            x_e(1)=x_e(No_of_TopRows+1)  //Use the value computed at the last iteration//
            x(1)=x(No_of_TopRows+1)                    //by the top triangle//
            z(1)=z(No_of_TopRows+1)      //left edge continues;use values computed by //
            I(1)=I(No_of_TopRows+1)      //the top triangle//
    End Else        //Since frac(yb)<.5 this row was rendered by the top triangle//
    Begin           //We must advance to the next lower row//
            X_e(1)=xb+[.5-frac(yb)]*slope_BC-slope_BC       //one row lower//
            X(1)=int(X_e(1))+.5
            x_e(1)=x_e(No_of_TopRows+1)
            x(1)=int(x_e(1))+.5
            y(1)=int(yb)+.5-1=int(yb)-.5                    //one row lower//
            z(1)=z(No_of_TopRows+1)                         //copy z and rgb //
            I(1)=I(No_of_TopRows+1)
    End {if frac(yb)}

If ya=yb Then   //Flattop triangle with AC=left and BC=right edge//
    Begin           //Flattop triangles must initialize both edges//
            If frac(yb)>=.5 Then        //Reinitialize left edge//
            Begin           //Since frac(yb)>.5 this row belongs to the triangle//
                x_e(1)=xa+[.5-frac(yb)]*slope_AC    //Reinitialize left edge variables//
                x(1)=int(x_e(1))+.5
                y(1)=int(yb)+.5
                dx=x(1)-xa
                dy=y(1)-yb
                z(1)=za+δz/δx*dx+δz/δy*dy           //adjust z and rgb //
                I(1)=Ia+δI/δx*dx+δI/δy*dy
                X_e(1)=xb+[.5-frac(ya)]*slope_BC
                X(1)=int(X_e(1))+.5
            End Else
            Begin   //Since frac(yb)<.5 only the next row belongs to the triangle//
                x_e(1)=xa+[.5-frac(yb)]*slope_AC-slope_AC
                x(1)=int(x_e(1))+.5
                y(1)=int(yb)+.5-1=int(yb)-.5
                dx=x(1)-xa
                dy=y(1)-yb
                z(1)=za+δz/δx*dx+δz/δy*dy           //adjust z and rgb //
                I(1)=Ia+δI/δx*dx+δI/δy*dy
                X_e(1)=xb+[.5-frac(ya)]*slope_BC-slope_BC
                X(1)=int(X_e(1))+.5
            End
    End {If ya=yb}

For i=1 to No_of_BottomRows Do
Begin

//BC=bottom right edge//
        If  frac(X_e(i))=<0.5   //Pixels centered on the right edge are not drawn//
        Begin                   //Adjust such that we are inside //
                                //walk to the next pixel to the right //
                X(i)=X(i)-1     //new x(i) inside the triangle//
        End
        X_e(i+1)=X_e(i)-slope_BC            //compute the fractional x address//
        X(i+1)=int[X_e(i+1)]+.5
        dX=X(i+1)-X(i)                      //delta between integer addresses//
    //AC= bottom left edge (also top left edge)//
        If frac(x_e(i))>0.5 Then
        Begin                   //Adjust such that we are inside //
                                //walk to the next pixel to the right //
                x(i)=x(i)+1     //new x(i) inside the triangle//
                z=z+δz/δx       //adjust z //
                I=I+δI/δx       //adjust the color //
        End
        x_e(i+1)=x_e(i)-slope_AC            //compute the fractional x address//
```

```
   x(i+1)=int[x_e(i+1)]+.5
   dx=x(i+1)-x(i)                       //delta between integer addresses//
   z(i+1)=z(i)+δz/δx*dx-δz/δy           //calculate the new z value//
   I(i+1)=I(i)+δI/δx*dx-δI/δy           //calculate the new rgb value//
  End {For}
End {If flag_AB=...}

For i=1 to No_of_BottomRows Do        //Draw the bottom triangle//
  Begin
        z_span=z(i)     //z_span and I_span are local variables that get initialized//
        I_span=I(i)                     //for every span//
        Begin
          For x=x(i) to X(i) Do    //Draw the pixels betwen x(i) and X(i)//
          Begin                    //y(i) is obviously constant along the span//
                Write_Pixel(x,y(i),z_span,I_span)
                z_span=z_span+δz/δx//iterate z along the span//
                I_span=I_span+δI/δx//iterate the color along the span//
          End
          y(i+1)=y(i)-1                 //iterate the raster number//
        End
  End [For i=1...}
End {Triangle}

Procedure Write_Pixel (x,y,z,I)
Begin
        Read(x,y,background,z_buffer)   //Read contents of location (x,y) //
        If z =< z_buffer Then
        Begin
          new_color=I
          Write(x,y,new_color)
        End
End
```

I claim:

1. A method of rasterizing a collection of objects, comprising the steps of:

dividing the objects into triangles;

associating coordinates with each vertex of said triangles, said coordinates being an x-coordinate and a y-coordinate relative to a pixel grid of a pixelated display device, thereby mapping said triangles onto the image formed by coloring pixels in said pixel grid;

determining, for a set of pixels in said pixel grid, which pixels in said set are inside an area defined on said pixel grid by a triangle and which pixels are outside said triangle, by the steps of:

rounding each vertex of said triangle to a center of a pixel to form a rounded triangle with vertices A, B and C with coordinates $(x_a, y_a)$, $(X_b, Y_b)$, $(X_c, Y_c)$, respectively;

calculating an edge function for at least one edge of said rounded triangle from said coordinates of vertices for a pixel located at a point (x,y), wherein a value of said edge function evaluated at said point (x,y) indicates whether said point is inside said rounded triangle, outside said rounded triangle, or exactly on an edge of said rounded triangle associated with said edge function;

associating said point with one said rounded triangle inside or said rounded triangle outside according to an edge decision rule when said edge function indicates said point to be exactly on said edge;

associating pixels within said rounded triangle with an interior of said triangle and pixels without said rounded triangle with an exterior of said triangle.

2. The method of claim 1, wherein said step of dividing further includes the step of dividing a first triangle into two distinct triangles if a vertex of a second triangle joins said first triangle at a point other than a vertex.

3. The method of claim 1, further comprising the step of coloring all of said pixels associated with said interior of said triangle.

4. The method of claim 1, wherein said edge function is used to perform antialiasing, whereby pixels along an edge between a first triangle having a first color and a second triangle having a second color, are colored using a weighted color that is based on said first color and said second color.

5. A method of rasterizing a collection of objects, comprising the steps of:

dividing the objects into triangles;

associating coordinates with each vertex of said triangles, said coordinates being an x-coordinate and a y-coordinate relative to a pixel grid of a pixelated display device, thereby mapping said triangles onto the image formed by coloring pixels in said pixel grid;

determining, for a set of pixels in said pixel grid, which pixels in said set are inside an area defined on said pixel grid by a triangle and which pixels are outside said triangle, by the steps of:

rounding each vertex of said triangle to a center of a pixel to form a rounded triangle with vertices A, B and C with coordinates $(x_a, y_a)$, $(X_b, Y_b)$, $(X_c, Y_c)$, respectively;

calculating a first characteristic edge function for a pixel located at a point with coordinates (x,y), said first characteristic edge function equal to $(x-x_a)(Y_{c-Ya})-(y-x_a)(Y_{c-ya})$;

calculating a second characteristic edge function for said pixel, said second characteristic edge function equal to $(x-x_c)(y_a-y_b)-(Y-x_c)(Y_{a-Yb})$;

calculating a third characteristic edge function for said pixel, said third characteristic edge function equal to $(x-x_b)(y_a-y_b)-(Y-x_b)(y_{,a}-y_b)$;

associating said pixel with an interior of said rounded triangle when said first, second and third characteristic edge functions result in nonzero values with a same sign;

associating said pixel with an exterior of said rounded triangle when said first, second and third characteristic edge functions result in nonzero values with different signs;

associating said pixel with one of said interior or said exterior of said rounded triangle according to an edge rule when at least one value of said characteristic edge functions is zero;

associating pixels in said interior of said rounded triangle with an interior of said triangle and pixels in said exterior of said rounded triangle with an exterior of said triangle.

6. The method of claim 5, further comprising the steps of:

coloring a pixel according to an exterior color function when said pixel is associated with said exterior of said triangle; and coloring a pixel according to an interior color function different from said exterior color function when said pixel is associated with said interior of said triangle.

7. The method of claim 5, wherein said step of dividing further includes the step of dividing a first triangle into two distinct triangles if a vertex of a second triangle joins said first triangle at a point other than a vertex.

8. A method of rasterizing a triangle, comprising the steps of;

rounding each vertex of the triangle to a center of a pixel to form a rounded triangle;

calculating an edge function for at least one edge of said rounded triangle for a pixel located at a point (x,y), wherein a value of said edge function evaluated at said point (x,y) indicates whether said point is inside said rounded triangle, outside said rounded triangle, or exactly on an edge of said rounded triangle associated with said edge function; and coloring said point (x,y) a first color if said (x,y) is inside said rounded triangle or a second color if it is outside said rounded triangle.

9. The method of claim 8, further comprising the step of repeating said steps of calculating and coloring for each pixel along each edge of said rounded triangle, and further comprising the step of coloring in pixels along a scan line between pixels located on a left edge and pixels located on a right edge of said rounded triangle with said first color.

* * * * *